US012725577B2

(12) United States Patent
Li et al.

(10) Patent No.: US 12,725,577 B2
(45) Date of Patent: Sep. 1, 2026

(54) GATE DRIVING CIRCUITS AND DISPLAY PANELS

(71) Applicant: Shenzhen China Star Optoelectronics Semiconductor Display Technology Co., Ltd., Shenzhen (CN)

(72) Inventors: Guangyao Li, Shenzhen (CN); Baixiang Han, Shenzhen (CN); Xiang Yin, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 386 days.

(21) Appl. No.: 18/293,792

(22) PCT Filed: Jan. 8, 2024

(86) PCT No.: PCT/CN2024/071069
§ 371 (c)(1),
(2) Date: Jan. 31, 2024

(87) PCT Pub. No.: WO2025/138329
PCT Pub. Date: Jul. 3, 2025

(65) Prior Publication Data
US 2026/0162615 A1 Jun. 11, 2026

(30) Foreign Application Priority Data
Dec. 29, 2023 (CN) ......................... 202311868189.1

(51) Int. Cl.
*G09G 3/3266* (2016.01)
*G09G 3/32* (2016.01)
*G09G 3/36* (2006.01)

(52) U.S. Cl.
CPC ............ *G09G 3/3266* (2013.01); *G09G 3/32* (2013.01); *G09G 3/3677* (2013.01); *G09G 2300/0819* (2013.01); *G09G 2310/0267* (2013.01); *G09G 2320/045* (2013.01); *G09G 2320/046* (2013.01); *G09G 2330/021* (2013.01)

(58) Field of Classification Search
CPC ........................ G09G 2310/0286; G11C 19/28
See application file for complete search history.

(56) References Cited

U.S. PATENT DOCUMENTS

2022/0309976 A1* 9/2022 Hu ......................... G11C 19/28
2023/0252933 A1* 8/2023 Guo ..................... G09G 3/3266
345/55

* cited by examiner

*Primary Examiner* — Sanjiv D. Patel

(57) ABSTRACT

The present disclosure provides a gate driving circuit and a display panel. Before a first pull-up module transmits a first power signal to a first node in response to a first starting signal, a second pull-down module transmits a second power signal to a third node in response to a second starting signal, and a pull-down hold module disconnects an electrical connection between a first power terminal and a second node in response to a potential of the third node.

15 Claims, 4 Drawing Sheets

GATE DRIVING CIRCUITS AND DISPLAY PANELS

RELATED APPLICATIONS

This application is a National Phase of PCT Patent Application No. PCT/CN2024/071069 having International filing date of Jan. 8, 2024, which claims the benefit of priority of China Patent Application No. 202311868189.1 filed on Dec. 29, 2023. The contents of the above applications are all incorporated by reference as if fully set forth herein in their entirety.

BACKGROUND

A gate driving circuit generally adopts a design of two output transistors. That is, the gate driving circuit includes a first output transistor and a second output transistor. A control terminal of the first output transistor is connected to a first node, and an input terminal of the first output transistor is configured to receive a first voltage. A control terminal of the second output transistor is connected to a second node, and an input terminal of the second output transistor is configured to receive a second voltage. Output terminals of the first output transistor and the second transistor are both electrically connected to an output terminal of the gate driving circuit. When the first output transistor turns on in response to a potential of the first node, the second output transistor is in an off state in response to a potential of the second node.

However, when the potential of the first node changes from a first level state to a second level state, and the potential of the second node changes from the second level state to the first level state, due to difference between the changes in the potentials of the first node and the second node, the second node changes slower than expected, which may cause the first output transistor and the second output transistor to turn on at the same time, causing the output terminal of the gate driving circuit to simultaneously receive the first voltage and the second voltage. At the same time, other transistors in the gate driving circuit that are electrically connected to the first node and the second node may also turn on, causing the second node and other nodes in the gate driving circuit to simultaneously receive high and low voltages, affecting normal operation of the gate driving circuit, and causing burn problems on a display panel applying the gate driving circuit.

SUMMARY

Embodiments of the present disclosure provide a gate driving circuit and a display panel, in which the burn problems on the display panel applying the gate driving circuit caused by key nodes in the gate driving circuit simultaneously receiving high and low voltages may be relieved.

Embodiments of the present disclosure provide gate driving circuits and display panels. The gate driving circuit includes a first pull-up module, a second pull-down module, a pull-down hold module, and an output module. The first pull-up module is electrically connected to a first node and a first power terminal, and configured to transmit a first power signal supplied by the first power terminal to the first node in response to a first starting signal. The second pull-down module is electrically connected to a second node, a third node, and a second power terminal, and configured to transmit a second power signal supplied by the second power terminal to the second node in response to the first starting signal. The pull-down hold module is electrically connected to the second node, the third node, and the first power terminal, and configured to control an electrical connection between the first power terminal and the second node in response to a potential of the third node. The output module is electrically connected to the first node and the second node, and configured to output a gate control signal in response to a potential of the first node and a potential of the second node. Before the first pull-up module transmits the first power signal to the first node in response to the first starting signal, the second pull-down module transmits the second power signal to the third node in response to a second starting signal, and the pull-down hold module disconnects the electrical connection between the first power terminal and the second node in response to the potential of the third node Embodiments of the present disclosure also provide a display panel including a first gate driving unit and a second gate driving unit. The first gate driving unit includes a plurality of any of the above gate driving circuits. The second gate driving unit is electrically connected to the first gate driving unit, and the second gate driving unit is configured to generate a plurality of starting signals to output to the plurality of gate driving circuits of the first gate driving unit. The starting signals include a first starting signal and a second starting signal.

EMBODIMENTS OF THE INVENTION

In order to make the purposes, technical solutions, and effects of the present disclosure clearer, the present disclosure will be further described in detail below with reference to the accompanying drawings and examples. It should be understood that the specific embodiments described here are only configured to explain the present disclosure and are not intended to limit the present disclosure.

The gate driving circuit and display panel provided by the present disclosure include a first pull-up module, a second pull-down module, a pull-down hold module, and an output module. Before the first pull-up module transmits a first power signal to a first node in response to a first starting signal, the second pull-down module transmits a second power signal to a third node in response to a second starting signal, so that the pull-down hold module disconnect an electrical connection between a first power terminal and the second node in response to a potential of the third node, so that when the first pull-up module transmits the first power signal to the first node in response to the first starting signal, the second pull-down module transmits the second power signal supplied by a second power terminal to the second node in response to the first starting signal, so that the second node only receives the second power signal when the first power signal is transmitted to the first node, so as to relieve the problem that when the first power signal is transmitted to the first node, due to the difference between the changes in potentials of the first node and the second node, the second node simultaneously receives the first power signal and the second power signal, which affects the normal operation of the gate driving circuit. When the gate driving circuit is applied in a display panel, it can also relieve the burn problem of the display panel.

Figure 1:
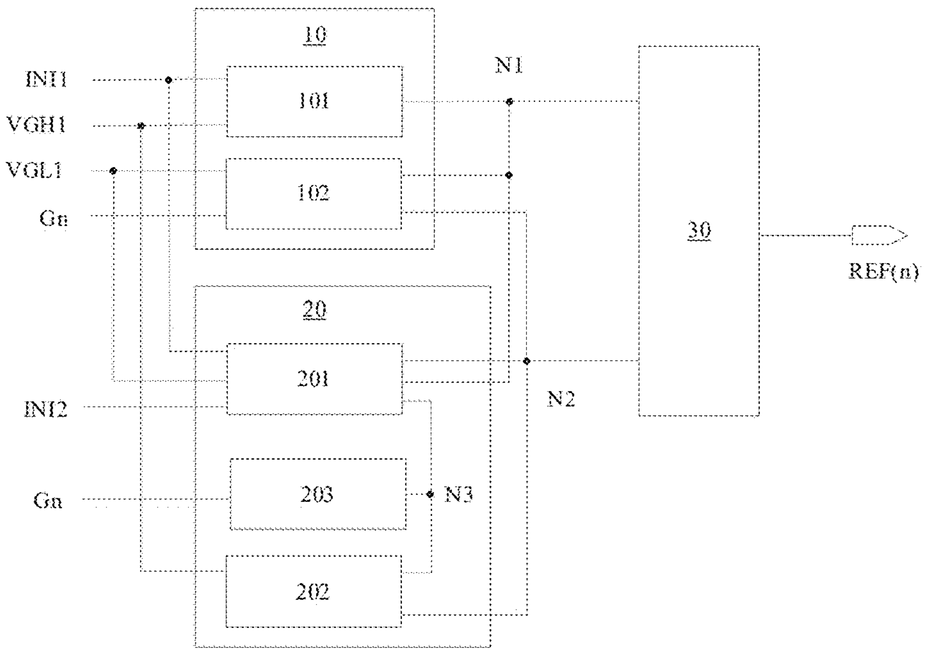
FIG. 1 is a schematic block diagram of a gate driving circuit provided by an embodiment of the present disclosure.

Specifically, FIG. 1 is a schematic block diagram of a gate driving circuit provided by an embodiment of the present disclosure. Embodiments of the present disclosure provide gate driving circuits. The gate driving circuit includes a first node control module 10, a second node control module 20, and an output module 30.

The first node control module 10 is electrically connected to a first node N1, a first power terminal VGH1, and a second power terminal VGL1. The first node control module 10 is configured to transmit a first power signal supplied by the first power terminal VGH1 to the first node N1 in response to a first starting signal INI1, or is configured to transmit a second power signal supplied by the second power terminal VGL1 to the first node N1 in response to a pull-down control signal Gn.

The second node control module 20 is electrically connected to a second node N2, the first power terminal VGH1, and the second power terminal VGL1. The second node control module 20 is configured to transmit the second power signal to the second node N2 in response to the first starting signal INI1, or is configured to transmit the first power signal to the second node N2 in response to the pull-down control signal Gn.

The output module 30 is electrically connected to the first node N1 and the second node N2. The output module 30 is configured to output a gate control signal REF in response to potentials of the first node N1 and the second node N2.

Before the first node control module 10 transmits the first power signal to the first node N1 in response to the first starting signal INI1, the second node control module 20 is configured to disconnect an electrical connection between the first power terminal VGH1 and the second node N2 in response to the second starting signal INI2, so that when the first power signal is transmitted to the first node N1, the second node N2 only receives the second power signal, but does not receive the first power signal, thereby relieving the problem that the second node simultaneously receives the first power signal and the second power signal, which affects the normal operation of the gate driving circuit.

Optionally, please continue to refer to FIG. 1, the first node control module 10 includes a first pull-up module 101, and the second node control module 20 includes a second pull-down module 201 and a pull-down hold module 202.

The first pull-up module 101 is electrically connected to the first node N1 and the first power terminal VGH1. The first pull-up module 101 is configured to transmit the first power signal supplied by the first power terminal VGH1 to the first node N1 in response to the first starting signal INI1.

The second pull-down module 201 is electrically connected to the second node N2, a third node N3, and the second power terminal VGL1. The second pull-down module 201 is configured to transmit the second power signal supplied by the second power terminal VGL1 to the second node N2 in response to the first starting signal INI1.

The pull-down hold module 202 is electrically connected to the second node N2, the third node N3, and the first power terminal VGH1. The pull-down hold module 202 is configured to control the electrical connection between the first power terminal VGH1 and the second node N2 in response to a potential of the third node N3.

Before the first pull-up module 101 is configured to transmit the first power signal to the first node N1 in response to the first starting signal INI1, the second pull-down module 201 is configured to transmit the second power signal to the third node N3 in response to the second starting signal INI2, and the pull-down hold module 202 is configured to disconnect the electrical connection between the first power terminal VGH1 and the second node N2 in response to the potential of the third node N3, so that when the first pull-up module 101 transmits the first power signal to the first node N1 in response to the first starting signal INI1, the second pull-down module 201 transmits the second power signal supplied by the second power terminal VGL1 to the second node N2 in response to the first activation signal INI1, so that when the first power signal is transmitted to the first node N1, the second node N2 only receives the second power signal, and the first power signal cannot act on the third node N3, thereby relieving the problem that when the first power signal is transmitted to the first node N1, due to the difference between the changes in potentials of the first node N1 and the second node N2, the second node N2 changes slower than expected, and the second node N2 simultaneously receives the first power signal and the second power signal, which affects the normal operation of the gate driving circuit. When the gate driving circuit is applied in the display panel, it may also relieve the burn problem of the display panel.

Figure 2:
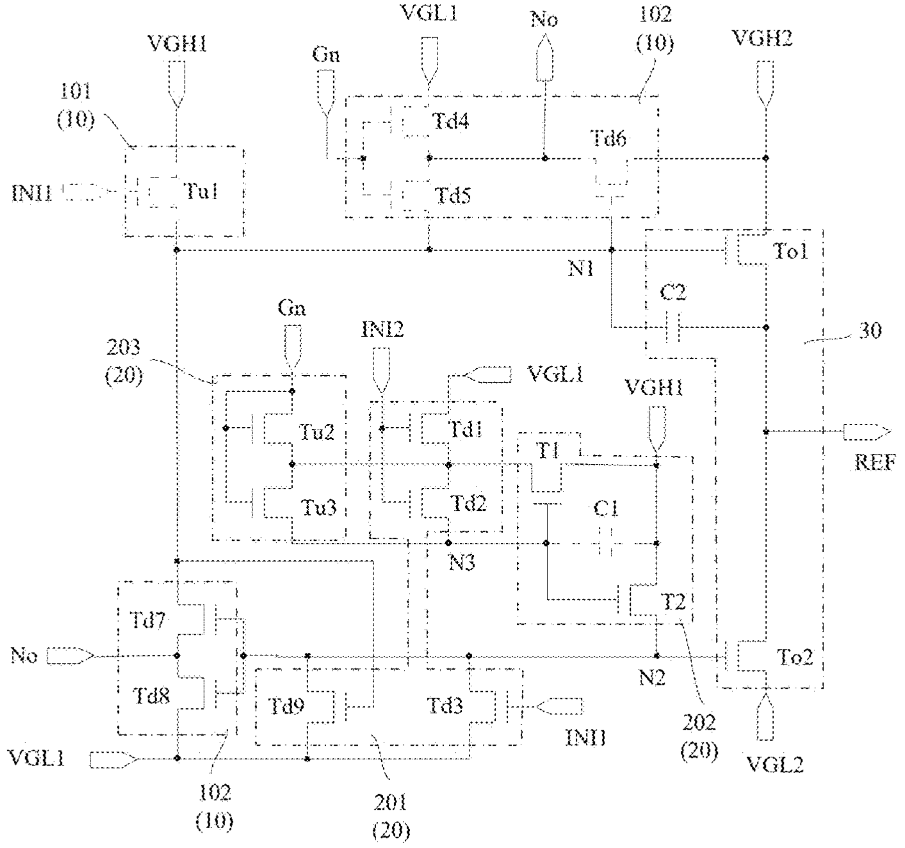
FIG. 2 is a structural diagram of a gate driving circuit provided by an embodiment of the present disclosure.

FIG. 2 is a structural diagram of the gate driving circuit provided by an embodiment of the present disclosure. Optionally, the first pull-up module 101 includes a first pull-up transistor Tu1. A control terminal of the first pull-up transistor Tu1 is configured to receive the first starting signal INI1. An input terminal of the first pull-up transistor Tu1 is electrically connected to the first power terminal VGH1, and an output terminal of the first pull-up transistor Tu1 is electrically connected to the first node N1.

Please continue to refer to FIG. 2, the second pull-down module 201 includes a first pull-down transistor Td1, a second pull-down transistor Td2, and a third pull-down transistor Td3.

A control terminal of the first pull-down transistor Td1 is configured to receive the second starting signal INI2, and an input terminal of the first pull-down transistor Td1 is electrically connected to the second power terminal VGL1.

A control terminal of the second pull-down transistor Td2 is configured to receive the second starting signal INI2. An input terminal of the second pull-down transistor Td2 is electrically connected to an output terminal of the first pull-down transistor Td1, and an output terminal of the second pull-down transistor Td2 is electrically connected to the third node N3.

A control terminal of the third pull-down transistor Td3 is configured to receive the first starting signal INI1. An input terminal of the third pull-down transistor Td3 is electrically connected to the second power terminal VGL1, and an output terminal of the third pull-down transistor Td3 is electrically connected to the second node N2.

The first pull-down transistor Td1 and the second pull-down transistor Td2 are configured to electrically connect the second power terminal VGL1 and the third node N3 in response to the second starting signal INI2, or configured to disconnect an electrical connection between the second power terminal VGL1 and the third node N3 in response to the second starting signal INI2. The third pull-down transistor Td3 is configured to electrically connect the second power terminal VGL1 and the second node N2 in response to the first starting signal INI1, or configured to disconnect the electrical connection between the second power terminal VGL1 and the second node N2 in response to the first starting signal INI1.

Please continue to refer to FIG. 2. The pull-down hold module 202 includes a first transistor T1, a second transistor T2, and a first capacitor C1.

Control terminals of the first transistor T1 and the second transistor T2 are electrically connected to the third node N3. Input terminals of the first transistor T1 and the second transistor T2 are connected to the first power terminal VGH1. An output terminal of the first transistor T1 is electrically connected to the output terminal of the first pull-down transistor Td1, and the output terminal of the second transistor T2 is electrically connected to the second node N2.

A first terminal of the first capacitor C1 is electrically connected to the third node N3, and a second terminal of the first capacitor C1 is electrically connected to the input terminal of the second transistor T2.

The second transistor T2 is configured to electrically connect the first power terminal VGH1 and the second node N2 in response to the potential of the third node N3, or configured to disconnect the electrical connection between the first power terminal VGH1 and the second node N2 in response to the potential of the third node N3.

Please continue to refer to FIG. 2, the output module 30 includes a first output transistor To1, a second output transistor To2, and a second capacitor C2.

A control terminal of the first output transistor To1 is electrically connected to the first node N1, an input terminal of the first output transistor To1 is electrically connected to a third power terminal VGH2, and an output terminal of the first output transistor To1 is electrically connected to the output terminal of the gate driving circuit. The first output transistor To1 is configured to electrically connect the third power terminal VGH2 and the output terminal of the gate driving circuit in response to the potential of the first node N1, or configured to disconnect an electrical connection between the third power terminal VGH2 and the output terminal of the gate driving circuit in response to the potential of the first node N1.

A control terminal of the second output transistor To2 is electrically connected to the second node N2, an input terminal of the second output transistor To2 is electrically connected to a fourth power terminal VGL2, and an output terminal of the second output transistor To2 is electrically connected to the output terminal of the gate driving circuit. The second output transistor To2 is configured to electrically connect the fourth power terminal VGL2 and the output terminal of the gate driving circuit in response to the potential of the second node N2, or to configured disconnect an electrical connection between the fourth power terminal VGL2 and the output terminal of the gate driving circuit in response to the potential of the second node N2.

A first terminal of the second capacitor C2 is electrically connected to the control terminal of the first output transistor To1, and a second terminal of the second capacitor C2 is electrically connected to the output terminal of the first output transistor To1.

The second pull-down module 201 transmits the second power signal to the second node N2 in response to the first starting signal INI1 when the first pull-up module 101 transmits the first power signal to the first node N1 in response to the first starting signal INI1, so when the first output transistor To1 turns on in response to the potential of the first node N1, the second output transistor To2 turns off in response to the potential of the second node N2, which may relieving the problem that the first output transistor To1 and the second output transistor To2 simultaneously turn on, causing the output terminal of the gate driving circuit to simultaneously receive a third power signal supplied by the third power terminal VGH2 and a fourth power signal supplied by the fourth power terminal VGL2.

Optionally, please continue to refer to FIG. 1, in order to ensure that the gate control signal REF output by the gate driving circuit stops maintaining an valid level state after the valid level state has been maintained for a required time period, the first node control module 10 also includes a first pull-down module 102. The first pull-down module 102 is electrically connected to the first node N1 and the second power terminal VGL1. The first pull-down module 102 is configured to transmit the second power signal to the first node N1 in response to the pull-down control signal Gn.

Optionally, please continue to refer to FIG. 2, the first pull-down module 102 includes a fourth pull-down transistor Td4 and a fifth pull-down transistor Td5.

A control terminal of the fourth pull-down transistor Td4 is configured to receive the pull-down control signal Gn, and an input terminal of the fourth pull-down transistor Td4 is electrically connected to the second power terminal VGL1.

A control terminal of the fifth pull-down transistor Td5 is configured to receive the pull-down control signal Gn. An input terminal of the fifth pull-down transistor Td5 is electrically connected to an output terminal of the fourth pull-down transistor Td4, and an output terminal of the transistor Td5 is electrically connected to the first node N1.

Optionally, please continue to refer to FIG. 1, in order to make the gate control signal REF output by the gate driving circuit return to an invalid level state after outputting the valid level state, the second node control module 20 also includes a second pull-up module 203. The second pull-up module 203 is electrically connected to the third node N3. The second pull-up module 203 is configured to transmit the pull-down control signal Gn to the third node N3 in response to the pull-down control signal Gn, so that the gate control signal REF output by the gate driving circuit can immediately have the invalid level state after maintaining the valid level state for the required time period.

Optionally, please continue to refer to FIG. 2, the second pull-up module 203 includes a second pull-up transistor Tu2 and a third pull-up transistor Tu3.

A control terminal of the second pull-up transistor Tu2 is configured to receive the pull-down control signal Gn. An input terminal of the second pull-up transistor Tu2 is electrically connected to the control terminal of the second pull-up transistor Tu2. An output terminal of the second pull-up transistor Tu2 is electrically connected to the output terminal of the first transistor T1.

A control terminal of the third pull-up transistor Tu3 is configured to receive the pull-down control signal Gn. An input terminal of the third pull-up transistor Tu3 is electrically connected to the output terminal of the second pull-up transistor Tu2. An output terminal of the third pull-up transistor Tu3 is electrically connected to the third node N3.

Optionally, because the first transistor T1 turns off when the first pull-down transistor Td1 and the second pull-down transistor Td2 turn on, and because the second pull-down transistor Td2 turns off when the first transistor T1 turns on, the first power signal cannot be transmitted to the third node N3 through the second pull-down transistor Td2. Therefore, in some embodiments, the output terminal of the first transistor T1 may be electrically connected only to the output terminal of the second pull-up transistor Tu2, but not to the output terminal of the first pull-down transistor Td1, so as to simplify a number of wires and save costs and wiring space in the process of preparing the gate driving circuit.

Optionally, please continue to refer to FIG. 1, in some embodiments, in order to make the gate control signal REF stably maintained in the invalid level state after having the valid level state, the first pull-down module 102 is also electrically connected to the second node N2 to electrically connect the second power terminal VGL1 and the first node N1 in response to the potential of the second node N2.

Optionally, please continue to refer to FIG. 2, the first pull-down module 102 includes a sixth pull-down transistor Td6, a seventh pull-down transistor Td7, and an eighth pull-down transistor Td8.

A control terminal of the sixth pull-down transistor Td6 is electrically connected to the first node N1. An input terminal of the sixth pull-down transistor Td6 is electrically connected to the first power terminal VGH1. An output terminal (i.e. No) of the sixth pull-down transistor Td6 is electrically connected to the output terminal of the fourth pull-down transistor Td4.

A control terminal of the seventh pull-down transistor Td7 is electrically connected to the second node N2, an input terminal of the seventh pull-down transistor Td7 is electrically connected to the output terminal of the sixth pull-down transistor Td6, and an output terminal of the pull-down transistor Td7 is electrically connected to the first node N1.

A control terminal of the eighth pull-down transistor Td8 is electrically connected to the second node N2. An input terminal of the eighth pull-down transistor Td8 is electrically connected to the second power terminal VGL1. An output terminal of the eighth pull-down transistor Td8 is electrically connected to the input terminal of the seventh pull-down transistor Td7.

Optionally, please continue to refer to FIG. 1, in some embodiments, in order to stably maintain the gate control signal REF in the active level state, the second pull-down module 201 is also electrically connected to the first node N1 to transmit the second power signal to the second node N2 in response to the potential of the first node N1.

Optionally, please continue to refer to FIG. 2, the second pull-down module 201 includes a ninth pull-down transistor Td9. A control terminal of the ninth pull-down transistor Td9 is electrically connected to the first node N1. An input terminal of the ninth pull-down transistor Td9 is electrically connected to the second power terminal VGL1, and an output terminal of the ninth pull-down transistor Td9 is electrically connected to the second node N2.

Optionally, in some embodiments, a voltage corresponding to the first power signal is greater than a voltage corresponding to the third power signal supplied by the third power terminal VGH2, and a voltage corresponding to the second power signal is less than a voltage corresponding to the fourth power signal supplied by the four power terminals VGL2, which enables the first output transistor To1 and the second output transistor To2 to be effectively turned off or turned on, thereby improving the reliability of turning off and turning on the transistors.

It can be understood that the transistors included in the gate driving circuit may be N-type transistors or P-type transistors, and the transistors included in the gate driving circuit may be oxide transistors or silicon transistors.

Figure 3:
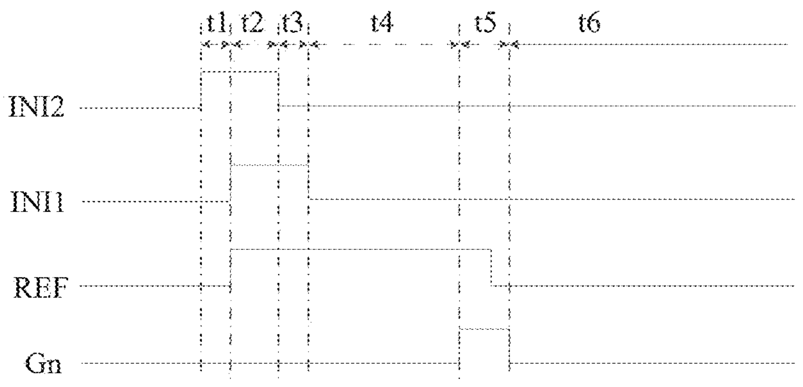
FIG. 3 is a timing diagram corresponding to a gate driving circuit provided by an embodiment of the present disclosure.

FIG. 3 is a timing diagram corresponding to the gate driving circuit provided by an embodiment of the present disclosure. Taking each transistor included in the gate driving circuit as an N-type transistor as an example, a working principle of the gate driving circuit will be described.

Please continue to refer to FIG. 2 and FIG. 3, a working process of the gate driving circuit includes a first phase t1 to a sixth phase t6.

During the first phase t1, the second starting signal INI2 has a high level state, and the first starting signal INI1 and the pull-down control signal Gn have a low level state.

The first pull-down transistor Td1 and the second pull-down transistor Td2 turn on, the second power signal is transmitted to the third node N3, the first transistor T1 and the second transistor T2 turn off, and the electrical connection between the first power terminal VGH1 and the third node N3 is disconnected.

During the second phase t2, the first starting signal INI1 and the second starting signal INI2 have a high level state, and the pull-down control signal Gn has a low level state.

The first pull-up transistor Tu1, the third pull-down transistor Td3, the first pull-down transistor Td1, and the second pull-down transistor Td2 turn on, the first power signal is transmitted to the first node N1, the first output transistor To1, the sixth pull-down transistor Td6, and the ninth pull-down transistor Td9 turn on, the second power signal is transmitted to the second node N2 and the third node N3, and the third power signal is transmitted to the output terminal of the gate driving circuit, so that the gate control signal REF has the valid level state. The first transistor T1, the second transistor T2, the fourth pull-down transistor Td4, the fifth pull-down transistor Td5, the seventh pull-down transistor Td7, the eighth pull-down transistor Td8, the second pull-up transistor Tu2, the third pull-up transistor Tu3, and the second output transistor To2 turn off.

During the third phase t3, the first starting signal INI1 has a high level state, and the pull-down control signal Gn and the second starting signal INI2 have a low level state.

The first pull-up transistor Tu1, the third pull-down transistor Td3, the first output transistor To1, the sixth pull-down transistor Td6, and the ninth pull-down transistor Td9 remain turning on, and the gate control signal REF remains in the active level state. The first transistor T1, the second transistor T2, the fourth pull-down transistor Td4, the fifth pull-down transistor Td5, the seventh pull-down transistor Td7, the eighth pull-down transistor Td8, the second pull-up transistor Tu2, the third pull-up transistor Tu3, and the second output transistor To2 remain turning off, and the first pull-down transistor Td1 and the second pull-down transistor Td2 turn off.

During the fourth phase t4, the pull-down control signal Gn, the first starting signal INI1, and the second starting signal INI2 have a low level state.

The second capacitor C2 maintains the potential of the first node N1, so that the first output transistor To1, the sixth pull-down transistor Td6, and the ninth pull-down transistor Td9 remain turning on, and the gate control signal REF remains active. The first transistor T1, the second transistor T2, the first pull-down transistor Td1, the second pull-down transistor Td2, the third pull-down transistor Td3, the fourth pull-down transistor Td4, the fifth pull-down transistor Td5, the seventh pull-down transistor Td7, the eighth pull-down transistor Td8, the first pull-up transistor Tu1, the second pull-up transistor Tu2, the third pull-up transistor Tu3, and the output transistor To2 turn off.

During the fifth phase t5, the pull-down control signal Gn has a high-level state, and the first starting signal INI1 and the second starting signal INI2 have a low-level state.

The second pull-up transistor Tu2, the third pull-up transistor Tu3, the fourth pull-down transistor Td4, and the fifth pull-down transistor Td5 turn on, the pull-down control signal Gn is transmitted to the third node N3, the second power signal is transmitted to the first node N1, and the sixth pull-down transistor Td6, the ninth pull-down transistor Td9, and the first output transistor To1 turn off. Affected by the first capacitor C1, it takes a certain time for the potential of the third node N3 to rise, so it also takes a certain time for the first transistor T1 and the second transistor T2 to convert from the off state to the on state. After the first transistor T1 and the second transistor T2 turn on, the first power signal is transmitted to the second node N2, the seventh pull-down transistor Td7, the eighth pull-down transistor Td8, and the second output transistor To2 turn on, the second power signal is transmitted to the first node N1, and the fourth power signal is transmitted to the output terminal of the gate driving circuit, so that the gate control signal REF has the invalid level state. The first pull-up transistor Tu1, the first pull-down transistor Td1, the second pull-down transistor Td2, and the third pull-down transistor Td3 turn off.

During the sixth phase t6, the pull-down control signal Gn, the first starting signal INI1, and the second starting signal INI2 have a low level state.

The potential of the third node N3 is maintained in the high level state through the action of the first capacitor C1 and the first transistor T1. The second transistor T2, the seventh pull-down transistor Td7, the eighth pull-down transistor Td8, and the second output transistor To2 remain turning on, and the gate control signal REF remains in the invalid level state. The first pull-up transistor Tu1 to the third pull-up transistor Tu3, the first pull-down transistor Td1 to the sixth pull-down transistor Td6, the ninth pull-down transistor Td9, and the first output transistor To1 remain turning off.

In the gate driving circuit provided by the embodiments of the present disclosure, before the first power signal is transmitted to the first node N1, the second pull-down module 201 transmits the second power signal to the third node N3 in response to the second starting signal INI2, and the second power signal accelerates to lower the potential of the third node N3, so that the first transistor T1 and the second transistor T2 can effectively turn off, thereby disconnecting the electrical connection between the first power terminal VGH1 and the second node N2, so that when the first pull-up module 101 transmits the first power signal to the first node N1 in response to the first starting signal INI1, the first power signal cannot act on the third node N3, thereby relieving the problem that the second node N2 simultaneously receives the first power signal and the second power signal, causing the first output transistor To1 and the second output transistor To2 to simultaneously turn on, which affects the normal operation of the gate driving circuit. When the gate driving circuit is applied in the display panel, it can also relieve the problems of dark lines and burns in the display panel.

In some embodiments, the gate driving circuit illustrated in FIG. 2 may be applied in medium and large size display panels. The display panel may be a passive light-emitting display panel (such as a liquid crystal display panel), a self-luminous display panel (such as a display panel including at least one of an organic light-emitting diode, a sub-millimeter light-emitting diode, a micro light-emitting diode, etc.).

Figure 4:
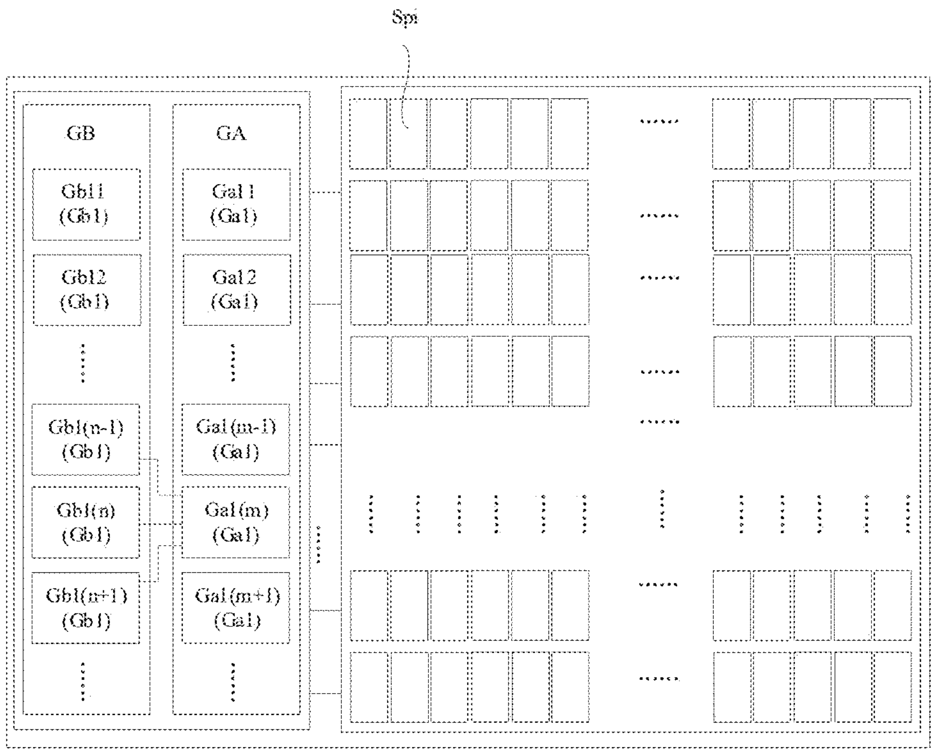
FIG. 4 is a schematic structural diagram of a display panel provided by an embodiment of the present disclosure.

FIG. 4 is a schematic structural diagram of a display panel provided by an embodiment of the present disclosure. Embodiments of the present disclosure also provide display panels, which including a first gate driving unit GA. The first gate driving unit GA includes a plurality of any of the above gate driving circuits (Ga1 in FIG. 4).

Optionally, the display panel also includes a second gate driving unit GB. The second gate driving unit GB is electrically connected to the first gate driving unit GA. The second gate driving unit GB is configured to generate a plurality of starting signals INI to be output to the plurality of gate driving circuits Ga1 of the first gate driving unit GA. The starting signals INI include the first starting signal INI1 and the second starting signal INI2.

Optionally, the second gate driving unit GB includes a plurality of first gate driving circuits Gb1, each of the first gate driving circuits Gb1 is configured to generate one of the starting signals INI. The first starting signal INI1 and the second starting signal INI2 are generated by different first gate driving circuits Gb1.

Figure 5:
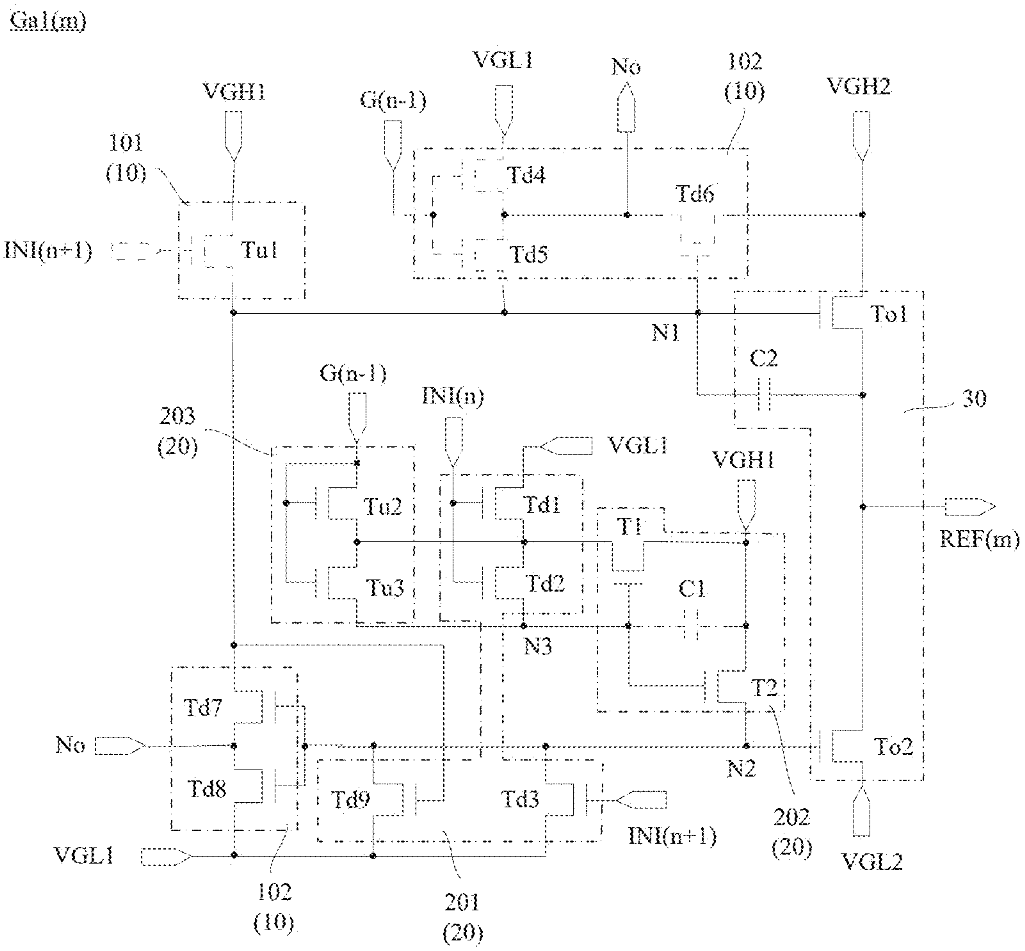
FIG. 5 is a structural diagram of an m-th stage gate driving circuit provided by an embodiment of the present disclosure.
Figure 6:
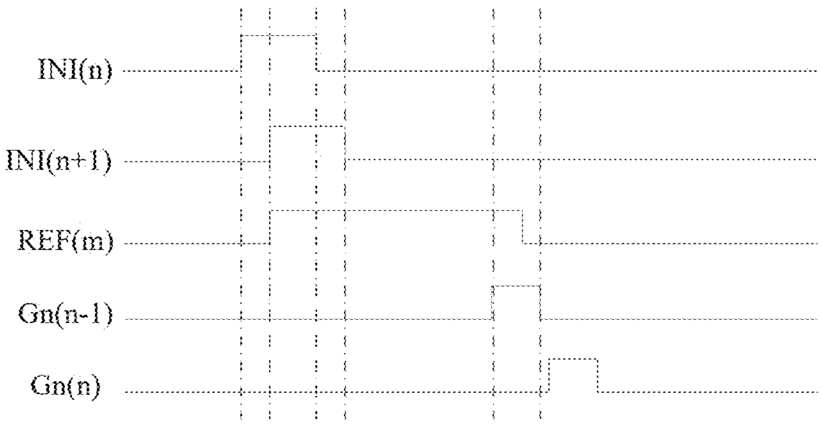
FIG. 6 is a timing diagram corresponding to an m-th stage gate driving circuit provided by an embodiment of the present disclosure.

FIG. 5 is a structural diagram of an m-th stage gate driving circuit provided by an embodiment of the present disclosure, and FIG. 6 is a timing diagram corresponding to the m-th stage gate driving circuit provided by an embodiment of the present disclosure. Optionally, an n-th stage starting signal INI(n) generated by an n-th stage first gate driving circuit Gb1(*n*) serves as the second starting signal INI2 of the m-th stage gate driving circuit Ga1(*m*), and an (n+1)th stage starting signal INI(n+1) generated by an (n+1)th stage first gate driving circuit Gb1(*n*+1) serves as the first starting signal INI1 of the m-th stage gate driving circuit Ga1(*m*). The m-th stage gate driving circuit Ga1(*m*) outputs an m-th stage gate control signal REF(m), and an effective pulse of the n-th stage starting signal INI(n) is ahead of an effective pulse of the (n+1)th stage starting signal INI(n+1), where $n>0$ and $m>0$.

Optionally, in some embodiments, each first gate driving circuit Gb1 is configured to generate one pull-down control signal Gn. Optionally, an (n−1)th stage pull-down control signal Gn(n−1) generated by an (n−1)th stage first gate driving circuit Gb1(*n*−1) serves as the pull-down control signal Gn of the m-th stage gate driving circuit Ga1(*m*).

Optionally, the timing of the (n−1)th stage pull-down control signal Gn(n−1) generated by the (n−1)th stage first gate driving circuit Gb1(*n*−1) and the n-th stage pull-down control signal Gn(n) generated by the n-th stage first gate driving circuit Gb1(*n*) is as illustrated in FIG. 6.

Optionally, in some embodiments, the display panel also includes a third gate driving unit GC. The third gate driving unit GC is electrically connected to the first gate driving unit GA. The third gate driving unit GC is configured to generate a plurality of pull-down control signals Gn to to be output to the plurality of gate driving circuits Ga1 of the first gate driving unit GA.

Optionally, the third gate driving unit GC includes a plurality of second gate driving circuits, and each of the second gate driving circuits is configured to generate one of the pull-down control signals Gn.

Optionally, a (x−1)th stage pull-down control signal Gn(x−1) generated by a (x−1)th stage second gate driving circuit Gc1(*x*−1) serves as the pull-down control signal Gn of the m-th stage gate driving circuit Ga1(*m*), where $x>0$.

On a condition that the gate driving circuit is applied in the display panel, because the second pull-up transistor Tu2, the third pull-up transistor Tu3, the fourth pull-down transistor Td4, and the fifth pull-down transistor Td5 are all controlled by the corresponding pull-down control signals Gn., a resistor-capacitance load corresponding to each of the second gate driving circuits is large, which may reduce the probability of the pull-down control signal Gn having an effective pulse with a small pulse width, which is beneficial to reducing the risk of leakage, reducing the probability of a short circuit between a low voltage of the pull-down control signal Gn and the first power signal, and improving the stability of the gate driving circuit.

Optionally, in some embodiments, the display panel may be configured to implement designs such as variable refresh frequency, high resolution, or low power consumption.

Optionally, please continue to refer to FIG. 4, the display panel also includes a plurality of sub-pixels Spi. The plurality of sub-pixels Spi are electrically connected to the first gate driving unit GA and the second gate driving unit GB.

Optionally, each sub-pixel Spi includes a light-emitting element Di and a pixel driving circuit electrically connected to the light-emitting element Di.

Figure 7:
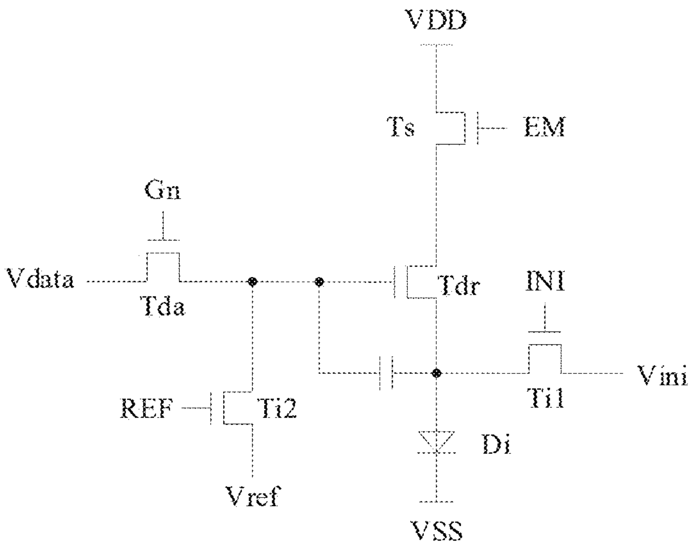
FIG. 7 is a schematic structural diagram of a pixel driving circuit provided by an embodiment of the present disclosure.

FIG. 7 is a schematic structural diagram of the pixel driving circuit provided by an embodiment of the present disclosure. The pixel driving circuit includes a drive transistor Tdr, a data transistor Tda, a reset transistor Ti1, an initialization transistor Ti2, a switching transistor Ts, and a storage capacitor Cst.

A control terminal of the drive transistor Tdr is electrically connected to an output terminal of the data transistor Tda. An input terminal of the drive transistor Tdr is electrically connected to an output terminal of the switching transistor Ts. An output terminal of the drive transistor Tdr is electrically connected to an anode of the light-emitting element Di.

A control terminal of the data transistor Tda is configured to receive a writing control signal, and an input terminal of the data transistor Tda is configured to receive a corresponding data signal Vdata.

A control terminal of the reset transistor Ti1 is configured to receive a reset control signal, an input terminal of the reset transistor Ti1 is configured to receive a reset signal Vini, and an output terminal of the reset transistor Ti1 is electrically connected to the anode of the light-emitting element Di.

A control terminal of the initialization transistor Ti2 is configured to receive a compensation control signal, an input terminal of the initialization transistor Ti2 is configured to receive an initialization signal Vref, and an output terminal of the reset transistor Ti1 is electrically connected to the control terminal of the drive transistor Tdr.

A control terminal of the switching transistor Ts is configured to receive a light-emitting control signal EM, an input terminal of the switching transistor Ts is electrically connected to a first voltage terminal VDD, and an output terminal of the switching transistor Ts is electrically connected to the input terminal of the drive transistor Tdr.

A cathode of the light-emitting element Di is electrically connected to a second voltage terminal VSS.

Optionally, in some embodiments, the control terminal of the initialization transistor Ti2 is electrically connected to a corresponding gate driving circuit Ga1, so as to utilize the gate control signal REF generated by the corresponding gate driving circuit Ga1 as the compensation control signal to turn on and turn off the initialization transistor Ti2.

Optionally, in some embodiments, the control terminal of the data transistor Tda is electrically connected to a corresponding first gate driving circuit Gb1, so as to utilize the pull-down control signal Gn generated by the corresponding first gate driving circuit Gb1 as the writing control signal to turn on and turn off the data transistor Tda.

Optionally, in some embodiments, the control terminal of the reset transistor Ti1 is electrically connected to a corresponding first gate driving circuit Gb1, so as to utilize the starting signal INI generated by the corresponding first gate driving circuit Gb1 as the reset control signal to turn on and turn off the reset transistor Ti1.

By electrically connecting the control terminal of the initialization transistor Ti2 to the corresponding gate driving circuit Ga1, electrically connecting the control terminal of the data transistor Tda to the corresponding first gate driving circuit Gb1, electrically connecting the control terminal of the reset transistor Ti1 to the corresponding first gate driving circuit Gb1, and electrically connecting the gate driving circuit Ga1 and the first gate driving circuit Gb1, the gate driving circuit Gb1 can simultaneously control the gate driving circuit Ga1 and the pixel driving circuit, which is beneficial to reducing the complexity of the circuits of the display panel, saving wiring space, and reducing power consumption and costs.

Optionally, in some embodiments, the control terminal of the data transistor Tda is electrically connected to the second gate driving circuit Gc1 to utilize the pull-down control signal Gn generated by the corresponding second gate driving circuit Gc1 as the writing control signal to turn on and turn off the data transistor Tda.

By electrically connecting the control terminal of the initialization transistor Ti2 to the corresponding gate driving circuit Ga1, electrically connecting the control terminal of the data transistor Tda to the second gate driving circuit Gc1, electrically connecting the control terminal of the reset transistor Ti1 to the corresponding first gate driving circuit Gb1, and electrically connecting the gate driving circuit Ga1 to the first gate driving circuit Gb1 and the second gate driving circuit Gc1, the first gate driving circuit Gb1 and the second gate driving circuit Gc1 can simultaneously control the gate driving circuit Ga1 and the pixel driving circuit, which is beneficial to reducing the complexity of the circuits of the display panel, saving wiring space, and reducing power consumption and costs.

Optionally, the designs of the first gate driving circuit Gb1 and the second gate driving circuit Gc1 may be obtained by referring to related designs.

Optionally, the gate driving circuits provided by the embodiments of the present disclosure may be integrated on a substrate (i.e. Gate On Array, GOA).

Figure 8:
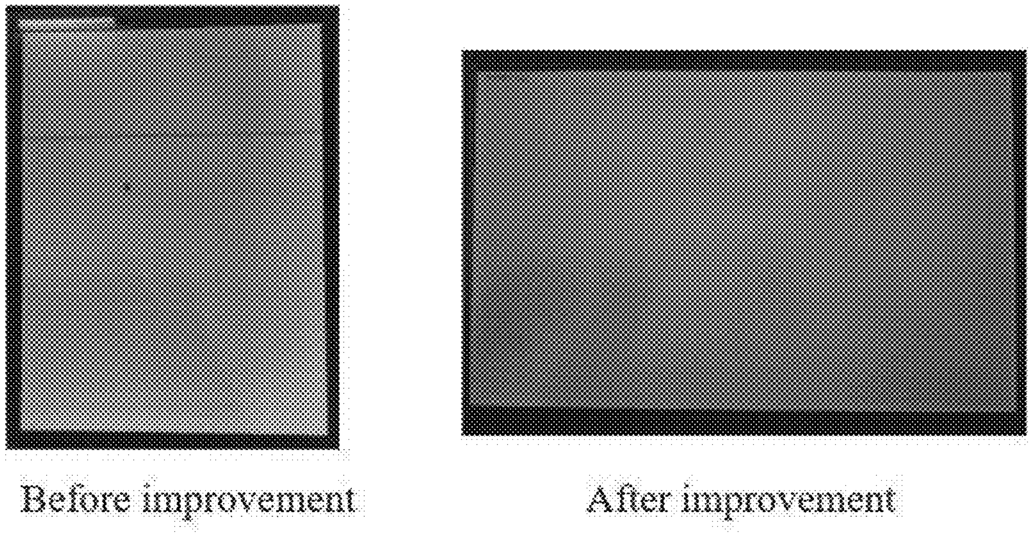
FIG. 8 is a verification diagram provided by an embodiment of the present disclosure.

FIG. 8 is a verification diagram provided by an embodiment of the present disclosure. The gate driving circuits provided in the embodiments of the present disclosure have been verified in actual high temperature and high humidity experiments. The verification results show that when an existing gate driving circuit is applied in both 14-inch and 17-inch display panels, the problem of dark lines will occur during the display process of the display panel, and a yield rate of the display panel is approximately 50% to 60%. When the gate driving circuit illustrated in FIG. 2 is applied in the 14-inch and 17-inch display panels, the display effect of the display panel is better, and the yield rate of the display panel is approximately 93.3%. Therefore, in the gate driving circuits provided by the embodiments of the present disclosure, the risk of short circuits of high voltage and low voltage at key nodes (such as the second node N2, the third node N3, and the output terminal of the first transistor T1) of the gate driving circuit can be reduced, and the product yield can be increased to 93.3% from the range of 50% to 60%.

The gate driving circuits provided in the present disclosure have been applied in 14-inch rigid display panels with high resolution.

In the gate driving circuits provided in the embodiments of the present disclosure, the second starting signal INI2 is configured to lower the potential of the third node N3, and then the first starting signal INI1 is configured to raise the potential of the first node N1 and lower the potential of the second node N2, and finally the pull-down control signal Gn is configured to lower the potential of the first node N1 and raise the potential of the second node N2, which is beneficial to the stability of the operation of the second pull-down module 201 and the pull-down hold module 202, and reducing the probability of dark lines and burns on the display panel applying the gate driving circuit.

This paper uses specific examples to illustrate the principles and implementation methods of the present disclosure. The description of the above embodiments is only configured to help understand the methods and core ideas of the present disclosure. At the same time, for those skilled in the art, there will be changes in the specific implementation and application scope based on the ideas of the present disclosure. In summary, the content of this description should not be understood as a limitation of the invention.

The invention claimed is:

1. A gate driving circuit, comprising a first pull-up module, electrically connected to a first node and a first power terminal, and configured to transmit a first power signal supplied by the first power terminal to the first node in response to a first starting signal;

a second pull-down module, electrically connected to a second node, a third node, and a second power terminal, and configured to transmit a second power signal supplied by the second power terminal to the second node in response to the first starting signal;

a pull-down hold module, electrically connected to the second node, the third node, and the first power terminal, and configured to control an electrical connection between the first power terminal and the second node in response to a potential of the third node; and an output module, electrically connected to the first node and the second node, and configured to output a gate control signal in response to a potential of the first node and a potential of the second node, wherein before the first pull-up module transmits the first power signal to the first node in response to the first starting signal, the second pull-down module transmits the second power signal to the third node in response to a second starting signal, and the pull-down hold module disconnects the electrical connection between the first power terminal and the second node in response to the potential of the third node.

2. The gate driving circuit according to claim 1, further comprising:

a first pull-down module, electrically connected to the first node and the second power terminal, and configured to transmit the second power signal to the first node in response to a pull-down control signal; and a second pull-up module, electrically connected to the third node, and configured to transmit the pull-down control signal to the third node in response to the pull-down control signal.

3. The gate driving circuit according to claim 2, wherein the second pull-down module comprises:

a first pull-down transistor, wherein a control terminal of the first pull-down transistor is configured to receive the second starting signal, and an input terminal of the first pull-down transistor is electrically connected to the second power terminal;

a second pull-down transistor, wherein a control terminal of the second pull-down transistor is configured to receive the second starting signal, an input terminal of the second pull-down transistor is electrically connected to an output terminal of the first pull-down transistor, and an output terminal of the second pull-down transistor is electrically connected to the third node; and a third pull-down transistor, wherein a control terminal of the third pull-down transistor is configured to receive the first starting signal, an input terminal of the third pull-down transistor is electrically connected to the second power terminal, and an output terminal of the third pull-down transistor is electrically connected to the second node.

4. The gate driving circuit according to claim 3, wherein the first pull-up module comprises a first pull-up transistor, a control terminal of the first pull-up transistor is configured to receive the first starting signal, an input terminal of the first pull-up transistor is electrically connected to the first power terminal, and an output terminal of the first pull-up transistor is electrically connected to the first node;

the pull-down hold module comprises a first transistor, a second transistor, and a first capacitor; a control terminal of the first transistor and a control terminal of the second transistor are electrically connected to the third node, an input terminal of the first transistor and an input terminal of the second transistor are electrically connected to the first power terminal, an output terminal of the first transistor and an output terminal of the first pull-down transistor are electrically connected; an output terminal of the second transistor is electrically connected to the second node, a first terminal of the first capacitor is electrically connected to the third node, and a second terminal of the first capacitor is electrically connected to the input terminal of the second transistor.

5. The gate driving circuit according to claim 4, wherein the second pull-up module comprises:

a second pull-up transistor, wherein a control terminal of the second pull-up transistor is configured to receive the pull-down control signal, an input terminal of the second pull-up transistor is electrically connected to the control terminal of the second pull-up transistor, and an output terminal of the second pull-up transistor is electrically connected to the output terminal of the first transistor; and a third pull-up transistor, wherein a control terminal of the third pull-up transistor is configured to receive the pull-down control signal, an input terminal of the third pull-up transistor is electrically connected to the output terminal of the second pull-up transistor, and an output terminal of the third pull-up transistor is electrically connected to the third node.

6. The gate driving circuit according to claim 2, wherein the first pull-down module comprises:

a fourth pull-down transistor, wherein a control terminal of the fourth pull-down transistor is configured to receive the pull-down control signal, an input terminal of the fourth pull-down transistor is electrically connected to the second power terminal; and a fifth pull-down transistor, wherein a control terminal of the fifth pull-down transistor is configured to receive the pull-down control signal, an input terminal of the fifth pull-down transistor is electrically connected to an output terminal of the fourth pull-down transistor, and an output terminal of the fifth pull-down transistor is electrically connected to the first node.

7. The gate driving circuit according to claim 6, wherein the first pull-down module comprises:

a sixth pull-down transistor, wherein a control terminal of the sixth pull-down transistor is electrically connected to the first node, an input terminal of the sixth pull-down transistor is electrically connected to the first power terminal, and an output terminal of the sixth pull-down transistor is electrically connected to the output terminal of the fourth pull-down transistor;

a seventh pull-down transistor, wherein a control terminal of the seventh pull-down transistor is electrically connected to the second node, an input terminal of the seventh pull-down transistor is electrically connected to the output terminal of the sixth pull-down transistor, and an output terminal of the seventh pull-down transistor is electrically connected to the first node; and an eighth pull-down transistor, wherein a control terminal of the eighth pull-down transistor is electrically connected to the second node, an input terminal of the eighth pull-down transistor is electrically connected to the second power terminal, and an output terminal of the eighth pull-down transistor is electrically connected to the input terminal of the seventh pull-down transistor.

8. The gate driving circuit according to claim 1, wherein the second pull-down module comprises a ninth pull-down transistor, a control terminal of the ninth pull-down transistor is electrically connected to the first node, an input terminal of the ninth pull-down transistor is electrically connected to the second power terminal, and output terminal of the ninth pull-down transistor is electrically connected to the second node;

the output module comprises a first output transistor, a second output transistor, and a second capacitor; a control terminal of the first output transistor is electrically connected to the first node, an input terminal of the first output transistor is electrically connected to a third power terminal, and an output terminal of the first output transistor is electrically connected to an output terminal of the gate driving circuit; a control terminal of the second output transistor is electrically connected to the second node, an input terminal of the second output transistor is electrically connected to a fourth power terminal, an output terminal of the second output transistor is electrically connected to the output terminal of the gate driving circuit; and a first terminal of the second capacitor is electrically connected to the control terminal of the first output transistor, and a second terminal of the second capacitor is electrically connected to the output terminal of the first output transistor.

9. The gate driving circuit according to claim 8, wherein a voltage corresponding to the first power signal is greater than a voltage corresponding to a third power signal supplied by the third power terminal, and a voltage corresponding to the second power signal is less than a voltage corresponding to a fourth power signal supplied by the fourth power terminal.

10. A display panel, comprising:

a first gate driving unit, comprising a plurality of gate driving circuits, wherein each of the gate driving circuits comprises a first pull-up module, a second pull-down module, a pull-down hold module, and an output module; the first pull-up module is electrically connected to a first node and a first power terminal, and configured to transmit a first power signal supplied by the first power terminal to the first node in response to a first starting signal; the second pull-down module is electrically connected to a second node, a third node, and a second power terminal, and configured to transmit a second power signal supplied by the second power terminal to the second node in response to the first starting signal; the pull-down hold module is electrically connected to the second node, the third node, and the first power terminal, and configured to control an electrical connection between the first power terminal and the second node in response to a potential of the third node; the output module is electrically connected to the first node and the second node, and configured to output a gate control signal in response to a potential of the first node and a potential of the second node; and wherein before the first pull-up module transmits the first power signal to the first node in response to the first starting signal, the second pull-down module transmits the second power signal to the third node in response to a second starting signal, and the pull-down hold module disconnects the electrical connection between the first power terminal and the second node in response to the potential of the third node; and a second gate driving unit, electrically connected to the first gate driving unit, configured to generate a plurality of starting signals to be output to the plurality of gate driving circuits of the first gate driving unit, wherein the starting signals comprise the first starting signal and the second starting signal.

11. The display panel according to claim 10, wherein the second gate driving unit comprises a plurality of first gate driving circuits, an n-th stage starting signal generated by an n-th stage first gate driving circuit serves as the second starting signal of an m-th stage gate driving circuit, and an (n+1)th stage starting signal generated by an (n+1)th stage first gate driving circuit serves as the first starting signal of the m-th stage gate driving circuit.

12. The display panel according to claim 10, wherein the plurality of first gate driving circuits are configured to generate a plurality of pull-down control signals to be output to the plurality of gate driving circuits of the first gate driving unit.

13. The display panel according to claim 12, wherein an (n−1)th stage pull-down control signal generated by an (n−1)th stage first gate driving circuit serves as the pull-down control signal of the m-th stage gate driving circuit.

14. The display panel according to claim 10, wherein the display panel comprises:

a plurality of sub-pixels, wherein each of the sub-pixels comprises a light-emitting element and a pixel driving circuit electrically connected to the light-emitting element; the pixel driving circuit comprises a drive transistor, a data transistor, a reset transistor, and an initialization transistor; an input terminal of the data transistor is configured to receive a corresponding data signal, a control terminal of the drive transistor is electrically connected to an output terminal of the data transistor, an input terminal of the reset transistor is configured to receive a reset signal, an output terminal of the reset transistor and an output terminal of the drive transistor are electrically connected to an anode of the light-emitting element, an input terminal of the initialization transistor is configured to receive an initialization signal, and an output terminal of the reset transistor is electrically connected to the control terminal of the drive transistor; and wherein a control terminal of the initialization transistor is electrically connected to a corresponding one of the gate driving circuits, a control terminal of the data transistor is electrically connected to a corresponding one of the first gate driving circuits, and a control terminal of the reset transistor is electrically connected to a corresponding one of the first gate driving circuit.

15. The display panel according to claim 14, wherein the pixel driving circuit comprises a switching transistor, a control terminal of the switching transistor is configured to receive a light-emitting control signal, an input terminal of the switching transistor is electrically connected to a first voltage terminal, and an output terminal of the switching transistor is electrically connected to an input terminal of the drive transistor.

* * * * *